March 9, 1965  R. W. JOHN ETAL  3,172,641
CASING CONSTRUCTION
Filed Nov. 23, 1962

Inventors
Russell W. John
Earl W. Hohlbeck
By John P. Hines
Attorney

United States Patent Office 3,172,641
Patented Mar. 9, 1965

3,172,641
CASING CONSTRUCTION
Russell W. John and Earl W. Hahlbeck, Milwaukee, Wis., assignors to Allis-Chalmers Manufacturing Company, Milwaukee, Wis.
Filed Nov. 23, 1962, Ser. No. 239,624
2 Claims. (Cl. 253—78)

This invention pertains to a rotary machine casing construction in general and more particularly to a novel means of attaching blades to the casing of such a machine as, for example, stator blades to a stator housing.

Stator blades are conventionally attached to the stator housing by providing an annular slot in the inner periphery of the stator housing of a particular configuration and constructing the root or shank portion of the stator blades of a configuration which is complementary to the slot configuration so that the blades, when positioned in the slot, are firmly held in place. It is common practice to construct the blade root and housing slot of the well-known fir tree configuration. Although a connection of this configuration is satisfactory from a functional standpoint, the machining operations are quite expensive.

It is the intention of applicants and a general object of this invention to provide an inexpensive stator construction wherein the stator blades are firmly held in position in the stator housing.

Another object of the subject invention is to provide a stator construction wherein the stator blades are resiliently biased into holding engagement with the stator housing slot.

An additional object of the subject invention is to provide a stator construction of the hereinbefore described type wherein the root portion of the stator blades may be fabricated by relying only on relatively inexpensive lathe machining operations.

These and other objects of the subject invention will become more fully apparent as the following description is read in light of the attached drawing, wherein.

Figure 1:
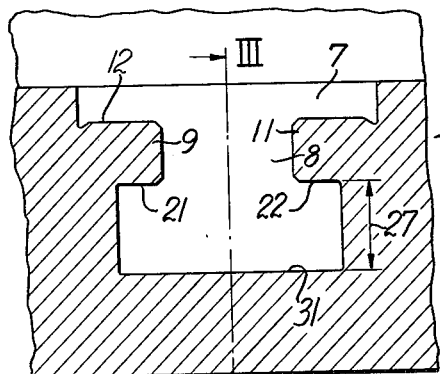
FIG. 1 is a cross sectional view of a portion of a stator housing showing the blade receiving slot.

Referring to the drawing, in FIG. 1, a portion of a stator housing generally designated 6 is shown with an annular blade receiving slot 7 in the inner peripheral surface of the housing. The slot 7 has a reduced neck portion 8 which is defined by laterally oppositely disposed annular shoulders 9 and 11. The inner peripheral portion of the stator housing may be relieved as at 12 to receive a rectangular platform 13 that may be provided at the lower end of a sator blade generally designated 14 to hold the blade from turning. The stator blade 14 has a reduced neck portion 16 which is of a diameter slightly less than the width of the neck portion 8 of the slot 7. A shoulder 17 on the stator blade 14 has radially inner facing surface portions 18 and 19. These surface portions are constructed for engagement with radially outer facing surfaces 21 and 22 defined by the shoulders 9 and 11 of the stator slot 7.

A resilient disk or spring means 23 is provided at the lower end of the stator blade root portion and is formed integral therewith. The end surface 24 of the spring means 23 is a plane surface and is normal to the major axis of the stator blade.

Figure 2:
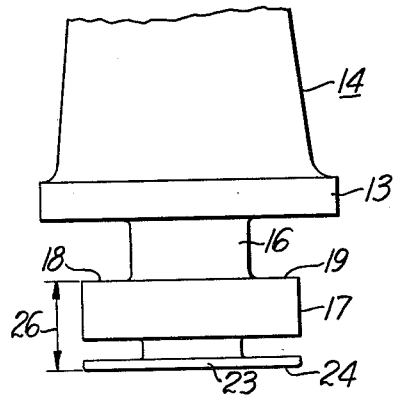
FIG. 2 is a side view of the stator blade root.

It should be noted that in the preferred embodiment of the stator blade root portion, shown herein in FIG. 2, the neck 16, the shoulder 17 and the spring means 23 are all circular configurations. With such an arrangement, the stator blade root portion can be initially formed of any conventional configuration. The shoulder 17 and spring means 23 and the neck portion 16 can be formed merely by machining the root stock to the desired dimension on a conventional metal working lathe. Furthermore, the spring action required in the spring means 23 is effected by removing the stock between the shoulder 17 and spring means by the same machining operation on a metal working lathe. Since a turning operation on a lathe is considerably less expensive than a broaching or milling operation, which is required in the usual fir tree type of root configuration, it can be seen that the preferred root configuration shown herein in FIG. 2 would be considerably more economical to manufacture.

In conventional practice, a stator housing for a rotary machine is constructed of upper and lower casing halves connected together along a longitudinal joint. The blade slots in both the upper and lower casing halves are aligned with one another and the blades are inserted into the slots before the casing halves are connected together. With applicants' improved root design, since the dimension 26 on the blade root taken in a radial direction is less than the dimension 27 in the stator slot taken in a radial direction, it is an easy matter to start the root into the stator slot and then force the blade root into the desired position in any convenient manner such as by striking the root with a mallet.

Figure 3:
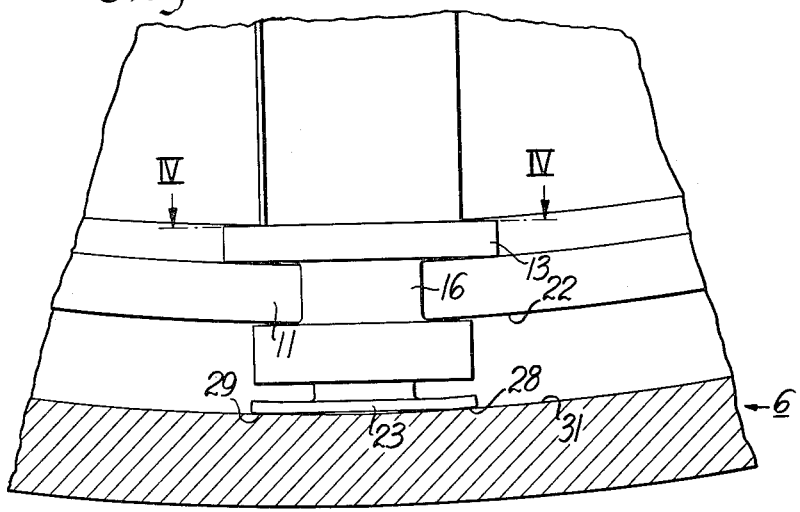
FIG. 3 is a section taken along the lines III—III of FIG. 1 with a stator blade shown in operative position in the blade slot.
Figure 4:
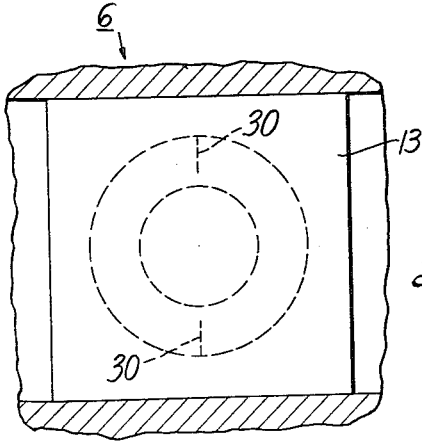
FIG. 4 is a section taken along the lines IV—IV of FIG. 3 with the bearing portion of the stator blade shoulder shown.

Referring now to FIG. 3, when the blade is positioned in the desired position in the stator slot, only the edges 28 and 29 of the spring disk 23 are in engagement with the bottom of the slot or base wall 31. Because of this end engagement, a resilient force is exerted inwardly relative to the center line of the stator housing forcing the radially inner surface portions 18 and 19 of the root shoulder into engagement with the radially outer surfaces 21 and 22 of the slot shoulders 9 and 11. There is a line contact 30 (FIG. 4) between the surface portions 18 and 19 on the root shoulder 17 and the slot shoulder surfaces 21 and 22. Since the stator slot 7 is annular and the resilient disk end surface 24 is noncurving, these edges 28 and 29 of the disk 23 will be bent inwardly in the manner shown in FIG 3.

Although only one embodiment of the subject invention has been shown and described herein, it will be obvious to those skilled in the art that various modifications thereto can be effected without departing from the spirit of the invention and it is intended that all such modifications as fall within a reasonable interpretation of the appended claims be covered.

Having now particularly described and ascertained the nature of our said invention and the manner in which it is to performed, we declare that what we claim is:

1. A casing construction comprising: a hollow cylindrical housing having a continuous annular blade root receiving slot in the inner peripheral surface thereof, said slot having a reduced neck portion defined by oppositely extending shoulders intermediate its radial dimension and a radially inwardly facing circumferentially extending base wall, each of said shoulders having oppositely radially facing surfaces; and a radially inwardly extending stator blade having a root portion, said root portion comprising a platform and a radially spaced shoulder connected to said platform by a neck portion, said platform and shoulder of said root portion having sliding inter engagement with the oppositely facing surfaces of the shoulders of said annular slot whereby the blade is held against radially inward displacement, said blade root portion further having a planar outer end, said planar outer end having a rigid midportion and oppositely spaced spring ends, said spring ends engaging said radially inwardly facing circumferentially extending base wall of said slot and supporting said midportion radially spaced therefrom, and a shoulder of said root portion in engagement with the radially outwardly facing surfaces of the shoulder of said annular slot.

2. The casing construction set forth in claim 1 wherein said shoulder, said neck portion and said planar outer end of said root portion are circular in transverse cross section relative to the major axis of said stator blade.

References Cited in the file of this patent

UNITED STATES PATENTS

| | | |
|---|---|---|
| 2,265,592 | Allen | Dec. 9, 1941 |
| 2,315,631 | Lloyd et al. | Apr. 6, 1943 |
| 2,422,193 | Hague | June 17, 1947 |
| 2,809,801 | Curry | Oct. 15, 1957 |

FOREIGN PATENTS

| | | |
|---|---|---|
| 1,192,696 | France | Apr. 20, 1959 |
| 280,221 | Great Britain | Feb. 23, 1928 |